United States Patent
Chuang et al.

(10) Patent No.: US 7,539,984 B2
(45) Date of Patent: May 26, 2009

(54) METHOD AND APPARATUS FOR SIMULATING A VIDEO DISC PLAYER

(75) Inventors: Willy Chuang, Taipei Hsien (TW); Kenny Chou, Taipei Hsien (TW); Ahan Hsieh, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 689 days.

(21) Appl. No.: 10/904,341

(22) Filed: Nov. 4, 2004

(65) Prior Publication Data

US 2005/0276579 A1   Dec. 15, 2005

(30) Foreign Application Priority Data

May 27, 2004   (TW) ............................. 93115117 A

(51) Int. Cl.
*G06F 9/44* (2006.01)
*H04N 5/91* (2006.01)

(52) U.S. Cl. ............................. 717/168; 386/46; 713/1

(58) Field of Classification Search .................. 386/46; 711/102–105; 709/223, 224; 713/1, 2; 717/168
See application file for complete search history.

(56) References Cited

U.S. PATENT DOCUMENTS

| 6,256,730 | B1 * | 7/2001 | deCarmo | ..................... 712/245 |
| 6,857,041 | B2 * | 2/2005 | LeClerg | ..................... 711/103 |
| 2004/0268337 | A1 * | 12/2004 | Culter | ..................... 717/168 |

* cited by examiner

*Primary Examiner*—Thai Tran
*Assistant Examiner*—Mishawn Dunn
(74) *Attorney, Agent, or Firm*—Winston Hsu

(57) ABSTRACT

A method for simulating video disc players includes loading firmware into memory for controlling a video disc player with an operating system. The method also includes and performing the following steps with the firmware: playing the video disc, loading a set of compressed data from a storage device, decompressing the set of compressed data and transforming the decompressed data into a set of output data in a format recognizable to the operating system, and finally, passing the set of output data to an output device to play.

14 Claims, 3 Drawing Sheets

METHOD AND APPARATUS FOR SIMULATING A VIDEO DISC PLAYER

BACKGROUND OF INVENTION

1. Field of the Invention

The present invention relates to a simulator, and more particularly, to a method and apparatus for simulating a video disc player during the development of the video disc player.

2. Description of the Prior Art

As watching VCDs and DVDs becomes popular home entertainment, numerous brands of video disc players emerge on the market. Manufacturers of video disc players find that the life cycle of a product is getting shorter and shorter due to the advance of technology. The earlier a product enters the market, the more profits and market share its manufacturer is likely to gain. To survive the fierce competition, manufacturers need not only to improve the speed, function, and usability of their products to meet the volatile demands from the market, but to develop new products at lower cost and within shorter time to increase profit margins and to enter the market as soon as possible. To achieve this end, it is necessary to examine the process of developing a video disc player to seek a solution.

A video disc player consists of hardware and embedded firmware. Conventionally a hardware platform is necessary to test whether the firmware can operate correctly with the hardware. Consequently the firmware cannot be tested and modified before the hardware is available in the process of developing a video disc player. Therefore the completion of the hardware of a video disc player becomes the bottleneck in the process of product development.

Scrutinizing the operation of a video disc player, the conventional method of playing a video disc comprises the steps of using a video disc player with embedded firmware to decompress the compressed data stored on the video disc, to transform the decompressed data into audio-video output signals, and to transmit the output signals to an output device to play the content of the video disc. The flow of the conventional method can be illustrated with FIG. 1.:

Step 100: start;
Step 110: loading a set of compressed audio-video data from a device for storing compressed data;
Step 120: the firmware driving the video disc player to decompress the set of compressed audio-video data;
Step 130: the firmware driving the video disc player to decode the set of audio-video data;
Step 140: the video disc player outputting the set of audio-video data to an output device to play the content of the video disc;
Step 150: end.

FIG. 1 shows the role firmware plays in driving the hardware of a video disc player to play a video disc. The firmware drives the hardware of the video disc player to decompress the compressed audio-video data stored on a video disc, to decode the decompressed audio-video data into output signals, and then to transmit the output signals to a display device to play the content of the video disc. Only after being loaded with the firmware can the hardware of a video disc player function and operate correctly. Although the hardware and the firmware of a video disc player can be developed separately, the firmware must be tested on the hardware according to the prior art. As a result the completion of the hardware becomes the bottleneck of the process of developing a video disc player.

SUMMARY OF INVENTION

The claimed invention provides a method and an apparatus for simulating a video disc player.

Briefly described, the claimed invention discloses a method for simulating a video disc player. One embodiment of the method includes the steps of loading the firmware for controlling a video disc player to execute in an operating system, extracting a set of compressed data from a storage device for storing compressed data, selecting a decompressing program from the operating system to decompress the format of the set of compressed data, executing the decompressing program to decompress the set of compressed data into a set of decompressed data, transforming the format of the set of decompressed data into the format of a set of output data recognizable to the operating system, and the operating system transmitting the set of output data to an output device to play the set of output data.

Another embodiment of the invention further discloses an apparatus for simulating a video disc player. The apparatus contains a system for simulating a video disc player. The system includes a receiving device for storing compressed audio-video data, a firmware device for storing firmware, an operating system device for providing an operating system and at least one related utility program to transform a set of the compressed audio-video data into a set of playable audio-video data according to the firmware, and a display device for playing the transformed set of playable audio-video data.

These and other contents of the claimed invention will no doubt become obvious to those of ordinary skill in the art after reading the following detailed description of the preferred embodiment that is illustrated in the various figures and drawings.

DETAILED DESCRIPTION

The conventional method of testing a video disc player uses hardware to decompress the compressed audio-video data loaded from a video disc, and to decode the decompressed audio-video data into audio-video signals which are then transmitted to an output device to play the content of the video disc. On the other hand, the present invention emphasizes that since utility programs for decompressing and decoding data are widely available in most operating systems, they can be used to achieve the functions of the hardware of a video disc player. The resources provided by an operating system can further be utilized to build an environment to test the firmware of a video disc player.

The present invention also emphasizes that in the process of developing a video disc player, the firmware and the hardware can be developed separately if a platform is provided to test and modify the firmware before the hardware is available. Then the progress of the hardware will not affect that of the firmware. The firmware can even be completed earlier than the hardware. After the hardware is available, it can be embedded with the firmware immediately to form a complete video disc player, saving considerable time and cost needed to test the firmware on the hardware compared to the prior art.

Figure 1:
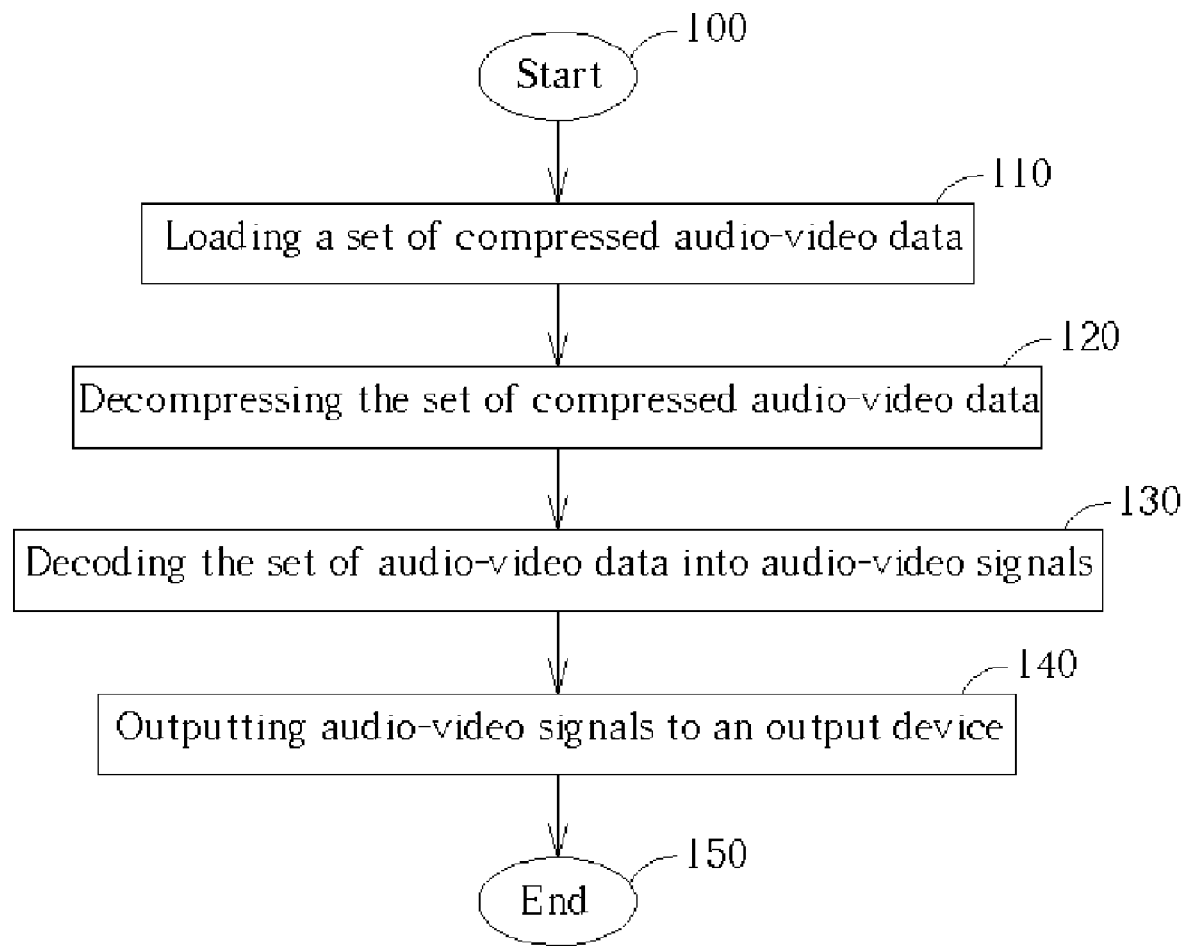
FIG. 1 is a block diagram of a video disc player playing a video disc according to the prior art.
Figure 2:
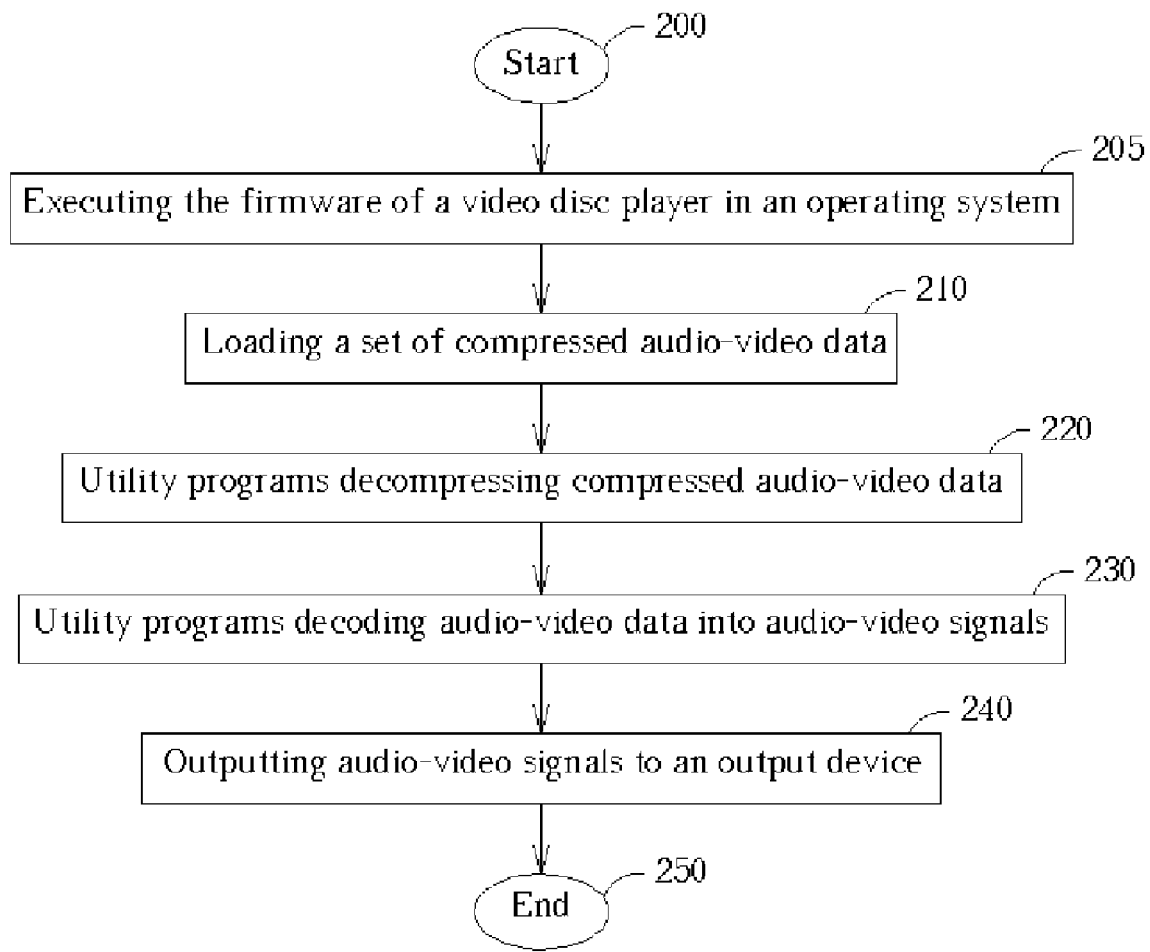
FIG. 2 is a block diagram of a video disc player playing a video disc according to the present invention.

The present invention simulates a video disc player by using the utility programs of an operating system to perform the functions of the hardware of the video disc player to decompress and to decode the data stored on a video disc, and provides the firmware with a platform for testing, debugging, and modification before the hardware is available. The present invention can indeed save the time and cost needed to develop a video disc player, and prevent the development of the hardware of the video disc player from being the bottleneck of the manufacturing process. The present invention method is illustrated with an example of playing a video disc. Please refer to FIG. 2. FIG. 2 is a block diagram of the present invention method of simulating a video disc player.

Step 200: start;
Step 205: loading the firmware of a video disc player into an operating system for execution;
Step 210: extracting a set of compressed audio-video data from a device for storing compressed data;
Step 220: according to the firmware, decompressing the set of compressed audio-video data by using the utility programs provided by the operating system;
Step 230: according to the firmware, transforming the format of the set of decompressed audio-video data into the format of a set of output data recognizable to the operating system;
Step 240: the operating system transmitting the set of output data to a display device to play the set of output data;
Step 250: end.

The present invention method utilizes an operating system to simulate a video disc player, thus the compressed data can be stored on a CD-ROM, the firmware stored in the memory, and the operating system can be any of such operating systems equipped with decompressing/decoding utility programs as the Windows operating system made by Microsoft, Macintosh made by Apple, Linux, etc.

Figure 3:
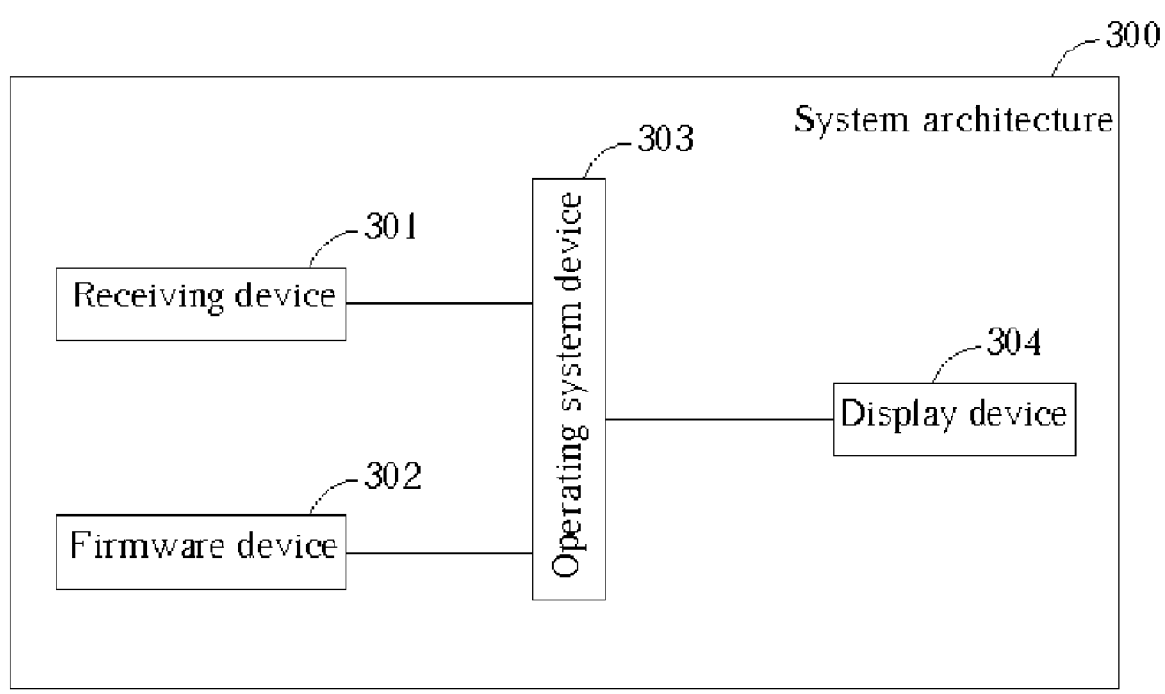
FIG. 3 is the system architecture for simulating a video disc player.

Please refer to FIG. 3. Corresponding to the method shown in FIG. 2, FIG. 3 shows system architecture 300 of the present invention for simulating a video disc player: a receiving device 301 is used for receiving the compressed audio-video data extracted, a firmware device 302 for storing the firmware, an operating system device 303 for providing an operating system and related utility programs to decode the compressed audio-video data into audio-video signals to be played according to the firmware, and a display device 304 for playing the transformed audio-vided signals. Here the display device 304 can be any display, the receiving device 301 and the firmware device 302 can be any of devices capable of storing electronic files such as memory or hard disks, and the operating system device 303 is selected from a group consisting of a computer, a CPU, and integrated circuits.

Referring to FIG. 2, the present invention method of playing a video disc differs from the conventional method in that conventional method uses hardware to decompress data and decode the decompressed data, while the present invention decompresses and transforms the format of the set of decompressed data into the format of a set of output data recognizable to the operating system by using the utility programs provided by an operating system. Therefore when playing a video disc, the present invention can decompress the compressed data extracted and transform the format of the decompressed data to be transmitted to the display device by using the utility programs provided by the operating system for decompression and transformation instead of using specific hardware by the conventional method.

The present invention utilizes the fact that when a product is being developed, the data transfer between the firmware and the hardware is regulated by a certain specification. As long as the input/output signals conform to the specification, the firmware can operate accordingly, whether it is the hardware or the operating system which receives the output signal of the firmware and responds back with input signals. Therefore, the present invention can make the process of firmware development more effective by simulating the hardware with an operating system. By "according to the firmware" we mean receiving the output signals from the firmware, and responding back with signals sent to the firmware conforming to the specification.

The conventional method of playing a video disc with a video disc player comprises the steps of decompressing the compressed data, and then decoding the decompressed data into the audio-video output signals by using the hardware. The hardware can decompress and decode data at a much higher speed than the operating system, so as to enable the video disc player to perform functions such as play, rewind, and fast forward smoothly. When the hardware is not completed yet in the process of developing a video disc player, however, the existence of a platform to execute and test the firmware is far more important than the speed of executing the firmware. By using the resources and utility programs provided by an operating system, the present invention is capable of building an environment to test whether the firmware of the video disc player functions correctly and meets the product requirements before the hardware is completed. It is no longer necessary to test and modify the firmware after the hardware is finished, and therefore it reduces the time and cost needed to manufacture a video disc player.

In summary, the present invention offers a platform to test the firmware by using the resources and utility programs provided by the operating systems to decompress and decode data, and solves the problem of the firmware of a video disc player being tested only after the hardware is finished. Then the completion of the hardware of a video disc player will not be a bottleneck in the process of developing a video disc player because the firmware can be tested in an operating system before the hardware is available. The present invention can significantly save the time and cost needed to manufacture a video disc player, and help the product to enter the market earlier.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for simulating a video disc player in a computing device for testing firmware of the video disc player before hardware of the video disc player is available, the method comprising the steps of:

loading firmware designed for controlling a video disc player to execute in an operating system of the computing device, wherein the firmware and hardware of the video disc player are developed separately and the firmware is available before the hardware;

extracting a set of compressed data from a storage device for storing compressed data in the computing device;

according to the firmware, selecting a decompressing program for decompressing the format of the set of compressed data from the operating system;

according to the firmware, executing the decompressing program to decompress the set of compressed data into a set of decompressed data;

according to the firmware, transforming the format of the set of decompressed data into the format of a set of output data recognizable to the operating system; and the operating system transmitting the set of output data to an output device to play the set of output data;

wherein during firmware steps the operating system operates according to receiving at least one output signal comprising decompressed data from the firmware, and then transmits at least one receiving signal to the firmware.

2. The method of claim 1 wherein the operating system is a computer operating system capable of providing a decompressing program to decompress the set of compressed data, and of transforming the format of the set of decompressed data.

3. The method of claim 1 wherein the operating system is chosen from the group consisting of the following: window operating system, Mac operating system, and Linux operating system.

4. The method of claim 1 wherein the format of the set of compressed data conforms to a compact disc format.

5. The method of claim 1 wherein the video disc player is selected from a group consisting of a video compact disc player and digital video disc player.

6. The method of claim 1 wherein the storage device for storing compressed data is selected from a group consisting of a video compact disc player and a digital video disc player.

7. The method of claim 1 wherein the firmware is stored in a memory, a hard disk, or a combination thereof.

8. A system for simulating a video disc player in a computing device wherein the system is used for testing firmware of the video disc player before hardware of the video disc player is available, the system comprising:

a receiving device for storing compressed audio-video data in the computing device;

a firmware device for storing firmware designed for controlling a video disc player, wherein the firmware and hardware of the video disc player are developed separately and the firmware is available before the hardware;

an operating system device for providing an operating system and at least one related utility program to transform a set of the compressed audio-video data into a set of playable audio-video data according to the firmware, wherein the operating system operates according to receiving at least one output signal comprising decompressed data from the firmware, and then transmits at least one receiving signal to the firmware; and a display device for playing the transformed set of playable audio-video data.

9. The system of claim 8 wherein the related utility program is a decompressing program, a decoding program, or a combination thereof.

10. The system of claim 8 wherein the operating system is any computer operating system capable of providing a decompressing program to decompress the set of compressed data, and of transforming the format of the set of decompressed data.

11. The system of claim 8 wherein the display device is a monitor.

12. The system of claim 8 wherein the receiving device or the firmware is a memory, a hard disk, or a combination thereof.

13. The system of claim 8 wherein the receiving device and the firmware device are capable of storing electronic files.

14. The system of claim 8 wherein the operating system device is a computer, a central processing unit, an integrated circuit, or a combination thereof.

* * * * *